E. SESSIONS.
BEAN HARVESTER.
APPLICATION FILED MAR. 14, 1917.
1,256,172.
Patented Feb. 12, 1918.
3 SHEETS—SHEET 3.
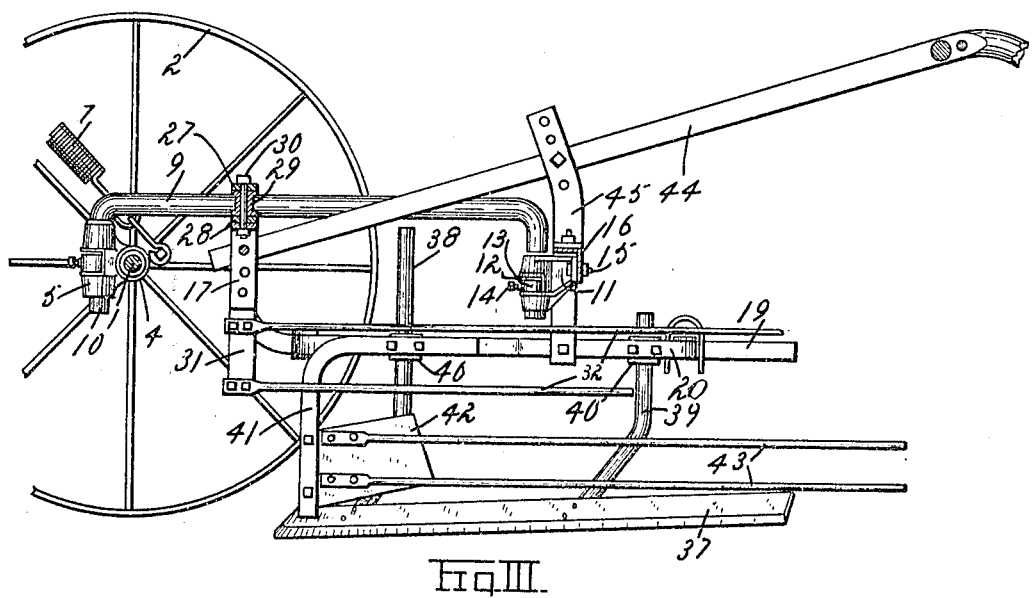
Fig.III.
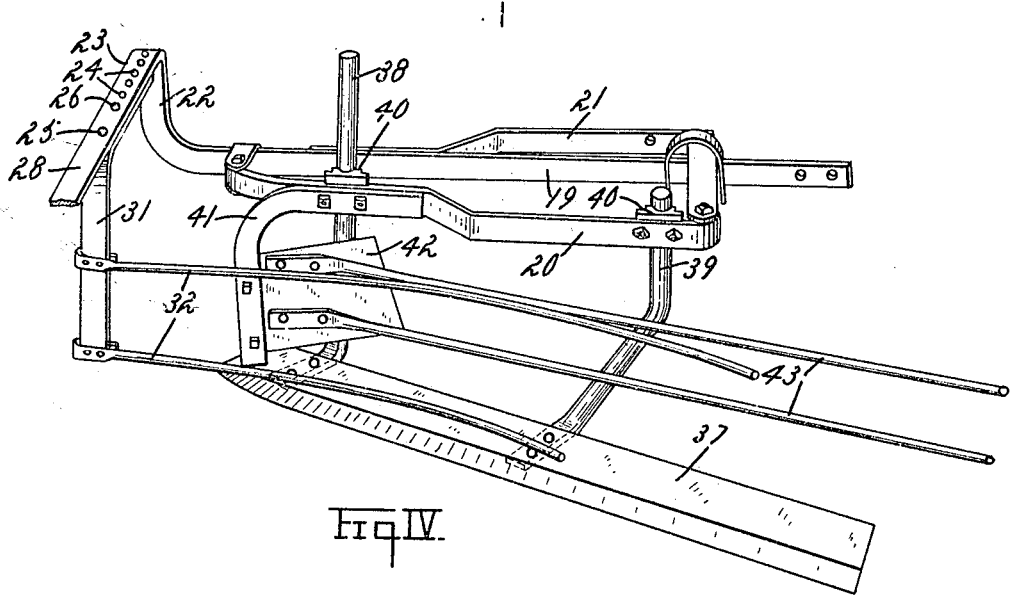
Fig.IV.
WITNESSES:
Luther Blake
Lenn Gilman
INVENTOR.
EDWARD SESSIONS.
BY Chappell & Earl
ATTORNEYS.

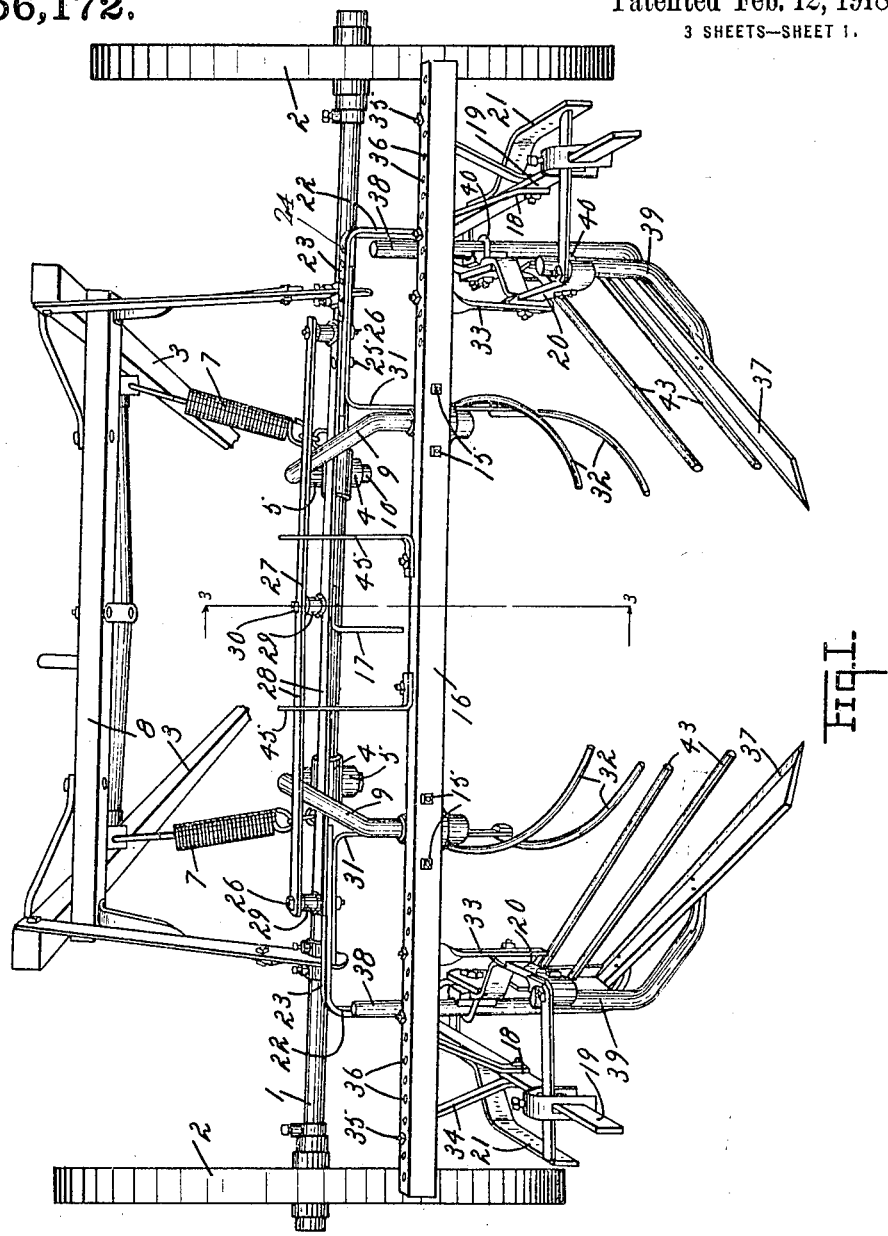

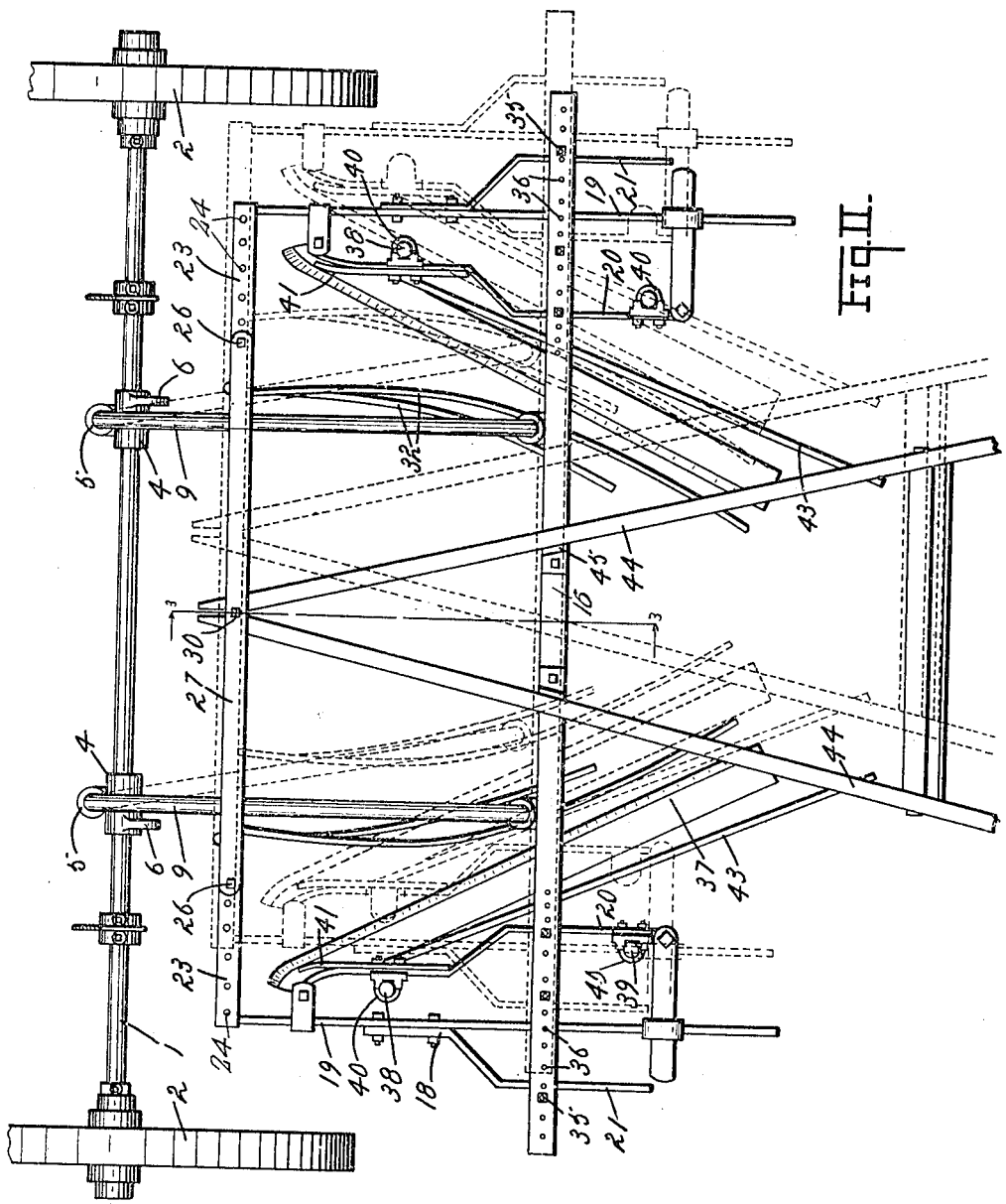

UNITED STATES PATENT OFFICE.

EDWARD SESSIONS, OF BRADLEY, MICHIGAN.

BEAN-HARVESTER.

1,256,172. Specification of Letters Patent. Patented Feb. 12, 1918.

Application filed March 14, 1917. Serial No. 154,891.

*To all whom it may concern:*

Be it known that I, EDWARD SESSIONS, a citizen of the United States, residing at Bradley, county of Allegan, State of Michigan, have invented certain new and useful Improvements in Bean-Harvesters, of which the following is a specification.

This invention relates to bean harvesters.
The objects of this invention are:
First, to provide a bean harvester which will shear the ends of the beans close to the top of the earth and push the stalks of two separate rows into a single row in a practically upright position.
Second, to provide a bean harvester of the character indicated above in which the shearing blade may be quickly and easily adjusted either in a vertical or horizontal plane as desired.
Third, to provide an improved attachment or attachments for a cultivator whereby it may be quickly and readily converted into a bean harvester.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:
Figure I is a perspective rear view of my improved harvester.

Fig. II is a plan view thereof with the parts shown in one adjusted position by dotted outlines.
Fig. III is a longitudinal section on a line corresponding to lines 3—3 of Figs. I and II.

Fig. IV is a perspective view of a section of the cultivator embodying my improvements.

In the drawing, similar reference characters refer to similar parts throughout the several views, and the sectional views are taken looking in the direction of the little arrows at the ends of the section lines.

As stated, I provide attachments whereby a cultivator may be transformed into a bean harvester. I, however, consider certain portions of this harvester, as elements of my invention.

In order that my invention may be clearly understood I will describe briefly the structure of those portions of the cultivator which are utilized by me.

Referring to the drawing, the reference character 1 indicates an axle upon the ends of which are rotatably mounted the carrying wheels 2 and to which is pivotally connected a pair of thills 3. Rotatably mounted upon the axle 1 are a pair of bearing sleeves 4 to each of which is secured a vertical bearing sleeve 5. The lugs 6 project rearwardly from each of said bearing sleeves 4. The tension springs 7 are connected at one end to these lugs and at the opposite end to the cross-bar 8 of the thills. A pair of draw bars 9 have their forward ends turned downwardly and journaled in the vertical bearing sleeves, as indicated at 10. The rear ends of the draw bars 9 are also turned downwardly and support sleeve brackets 11 which are secured to the ends of said draw bars by means of collars 12 which project through slots 13 of the brackets and engage with the edges of said slots to prevent vertical movement of said brackets. The collars are secured in position on the downturned portion of said draw bars by means of a set screw 14. Secured to the bracket 11 by means of bolts 15 is a transverse supporting bar 16.

I remove the teeth or shovels from the outer sections 18. These sections comprise a beam 19 and inner and outer tooth bars 20 and 21, respectively, secured thereto. The front end of the beam 19 is curved sharply upwardly, as shown at 22 in Fig. IV, and then turned inwardly, practically horizontal, as shown at 23. The portion 23 is provided with spaced holes 24 which coöperate with the bolts 25 and 26 at each end of the spacer bar 27 which comprises upper and lower bars 28 spaced apart by spools 29 through which pass the bolts 26 and 30. The draw bars 9 pass between the bars 28. Secured to the under part of portion 23 of the beam is a bracket 31. Supporting rods 32 are attached to the lower end of the bracket 31 in spaced relation and extend backwardly and inwardly, as indicated in Figs. I and II. Braces 33 and 34 secure the rear end of the inner tooth bar 20, and the beam 19, respectively, to the outer end portions of the supporting bar 16, bolts 35 and spaced holes 36 permitting an adjustment of the said braces longitudinally of the supporting bar. Shear blades or cutters 37 are secured to each of the inner tooth bars by means of upwardly extending standards 38 and 39 at the front and rear ends thereof, respectively. The lower ends of said standards are bent inwardly and secured beneath the cutters, as indicated in Fig. IV, in such a manner as to tilt the rear edge of the blade slightly above the forward cutting edge thereof. The inward extension of the rear standard 39 is longer than the corresponding extension of the forward standard 38, and this arrangement, coupled with the outwardly offset portion of the inner tooth bar to which the forward standard 38 is connected causes the two cutters to diverge from each other toward the front of the machine. The standards 38 and 39 are secured to the inner tooth bars by means of clips 40 which are used to support the cultivator teeth standards when the device is used as a cultivator. The same clip 40 which secures the front standards 38 to the inner tooth bar also secures the horizontal portion of a bracket 41 which supports an outwardly and rearwardly inclined guard plate 42 to which are secured the rearwardly and inwardly extending guide bars 43. Handles 44 are adjustably supported intermediate their ends by means of brackets 45 secured to the transverse supporting bar 16 and the front ends of the handles are secured to bracket 17, as indicated in Fig. III.

In the use of my improved bean harvester, the standards 38 and 39 are adjusted until the rear ends of the blades 37 travel about an inch below the surface of the earth and the forward ends thereof above the earth. By means of the handles 44 the operator is able to shift the blades laterally to accommodate them to any irregularities in the rows of beans, it being understood that each of the shear blades acts upon a separate row of beans. Vertical adjustment is permitted by the pivotal arrangement of the forward ends of the swinging arms 9 about a horizontal axis and provides means whereby the operator can lift the shear blades to avoid an obstruction or can lift and depress the blades to compensate to a practical extent for irregularities in the surface of the earth.

An important feature of my invention lies in the provision of the inner guide or supporting bars 32 which coöperate with the outer guide bars 43 to maintain the bean stalks in an upright position while acted upon by the blades and after they have been severed from the root. The relation of the two sets of guide bars is clearly shown in Fig. II. In the bean harvesters heretofore constructed, so far as I know, no guide bars corresponding to my inner guide bars 32 have been provided and, as a result, there is a tendency for the stalks to fall forward or to be pushed over instead of being cut and after being severed from the roots to tip inwardly, in which position they are oft times more or less covered up by the earth.

The several stalks are left in position so that they dry effectively and also so that they may be quite conveniently separated from weeds and trash by means of a fork.

From the above description of the structure of my improved mechanism it will be clear that I have not only invented a bean harvester which is novel as a whole, but I have also devised means whereby a cultivator of known construction may be quickly and easily converted into a bean harvester.

Having thus described my invention, what I claim as new and desire to secure by Letters Patent, is:

1. In a structure of the class described, the combination of an axle, carrying wheels thereon, rearwardly extending swinging arms pivotally mounted on said axle to swing in either a horizontal or vertical plane, a transverse supporting bar pivotally secured to the rear ends of said swinging arms, a horizontal spacer bar, a pair of spaced cultivator sections, each section having its rear end secured to one end of said transverse supporting bar and its front end secured to one end of said spacer bar, a pair of cutter blades diverging forwardly, spaced standards supporting said blades and adjustably secured to said cultivator sections, a downwardly turned bracket secured to each of said sections adjacent the front standards and carrying an outwardly and rearwardly extending guard plate, guide rods secured to said guard plates and extending substantially parallel with the rear edges of said shear blades, a downwardly extending bracket secured to said spacer bar and provided with rearwardly and inwardly curved guide rods the rear portions of which extend substantially parallel with and in a spaced relation to said first named guide rods, substantially as described.

2. In a structure of the class described, the combination of an axle, carrying wheels thereon, rearwardly extending swinging arms pivotally mounted on said axle, a transverse supporting bar secured to the rear ends of said swinging arms, a horizontal spacer bar, a pair of spaced cultivator sections, each section having its rear end secured to one end of said transverse supporting bar and its front end secured to one end of said spacer bar, a pair of cutter blades diverging forwardly, spaced standards supporting said blades, a bracket secured to each of said sections adjacent the front standards and carrying an outwardly and rearwardly extending guard plate, guide rods mounted to extend substantially parallel with the rear edge of said cutter blade, a bracket provided with guide rods the rear portions of which extend substantially parallel with and in a spaced relation to said first-named guide rods, substantially as described.

3. In a structure of the class described, the combination of an axle, carrying wheels rotatably mounted thereon, thills secured to said axle, rearwardly extending swinging arms pivotally mounted upon said axle to swing either horizontally or vertically, a transverse supporting bar pivotally mounted upon the rear end of said swinging arms, forwardly diverging cutter blades, spaced standards secured to said blades and adjustably supported from said transverse supporting bar, guard plates supported adjacent the front ends of said blades and extending rearwardly and outwardly, outer guide rods extending in spaced and parallel relation to said blades, inner guide rods having portions extending in spaced parallel relation to said first mentioned guide rods, and handles attached to said transverse cross bar for manipulating said blades, all coacting for the purpose specified.

4. In a structure of the class described, the combination of an axle, carrying wheels rotatably mounted thereon, thills secured to said axle, rearwardly extending swinging arms pivotally mounted upon said axle, a supporting bar mounted upon said swinging arms, diverging cutter blades, spaced standards secured to said blades and adjustably supported from said supporting bar, outer guide rods extending in spaced relation to said blades, inner guide rods having portions extending in spaced parallel relation to said first-mentioned guide rods, and means attached to said transverse cross bar for manipulating said blades, all coacting for the purpose specified.

5. In a structure of the class described, the combination of an axle, carrying wheels rotatably mounted thereon, thills secured to said axle, rearwardly extending swinging arms pivotally mounted upon said axle, a supporting bar mounted upon said swinging arms, diverging cutter blades, spaced standards secured to said blades and adjustably supported from said supporting bar, guide rods extending in spaced relation to said blades, and means attached to said transverse cross bar for manipulating said blades, all coacting for the purpose specified.

6. In a structure of the class described, the combination of an axle, carrying wheels, a pair of pivotally mounted draw bars, a transverse cross bar pivotally secured to the rear ends of said draw bars, cutter blades adjustably secured to said transverse supporting bar and diverging forwardly, outer guide rods adjacent the rear edge of said blades, inner guide rods having portions in spaced substantially parallel relation to said outer guide rods, and means for manipulating said blades in either a horizontal or vertical direction, substantially as described.

7. In a structure of the class described, the combination of an axle, carrying wheels, forwardly diverging swinging shear blades, means secured to said axle for supporting said blades so that they may be moved in either a horizontal or vertical direction, and guide bars supported adjacent said blades to support stalks and guide the severed stalks rearwardly in practically an upright position, substantially as described.

8. In a structure of the class described, the combination of an axle, carrying wheels, forwardly diverging cutter blades supported by said axle, outer guide rods extending substantially parallel with said blades, and inner guide rods having portions extending in spaced and substantially parallel relation to said outer guide rods, substantially as described.

9. In a structure of the class described, the combination with a pair of wheels having supporting means carried thereby, forwardly diverging swinging shear blades, means secured to said supporting means for supporting said shear blades so that they may be moved in a substantially horizontal plane, and means for simultaneously moving said shear blades in said plane.

10. In a structure of the class described, the combination of an axle, carrying wheels, forwardly diverging shear blades inclined upwardly and forwardly, means secured to said axle for supporting said blades, and guide rods supported adjacent said blades and spaced inwardly therefrom to support the stalks while being severed by said blades.

In witness whereof, I have hereunto set my hand and seal in the presence of two witnesses.

EDWARD SESSIONS. [L. S.]

Witnesses:
 ARTHUR DEUEL,
 GEORGE WILSON.

Copies of this patent may be obtained for five cents each, by addressing the "Commissioner of Patents, Washington, D. C."